Dec. 19, 1939.　　　　E. O. COREY　　　2,183,986
FORCE FEED LUBRICATOR
Filed March 16, 1937　　　4 Sheets-Sheet 1

INVENTOR.
BY Elmer O. Corey
Wood & Wood ATTORNEYS.

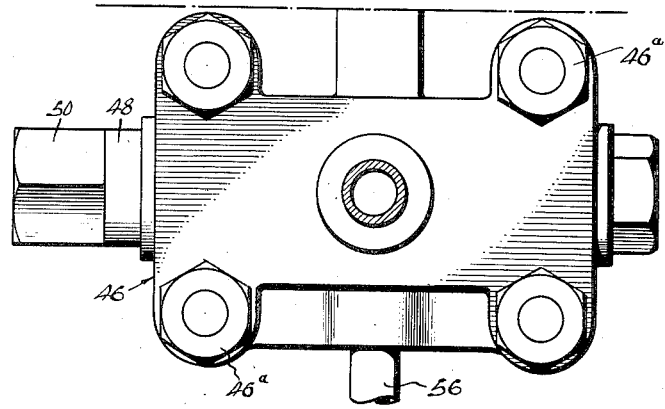
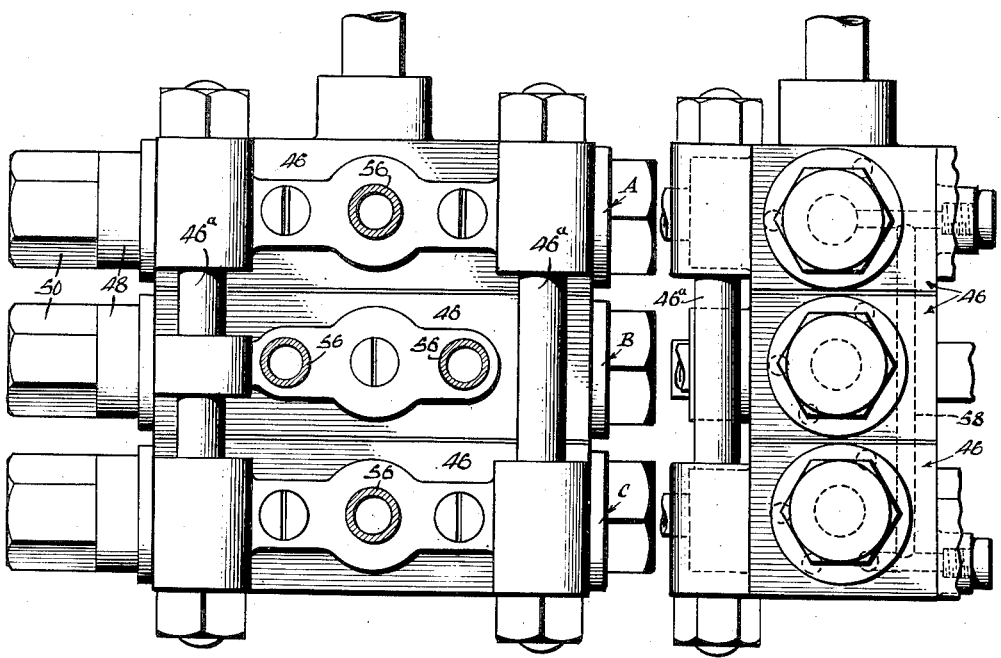

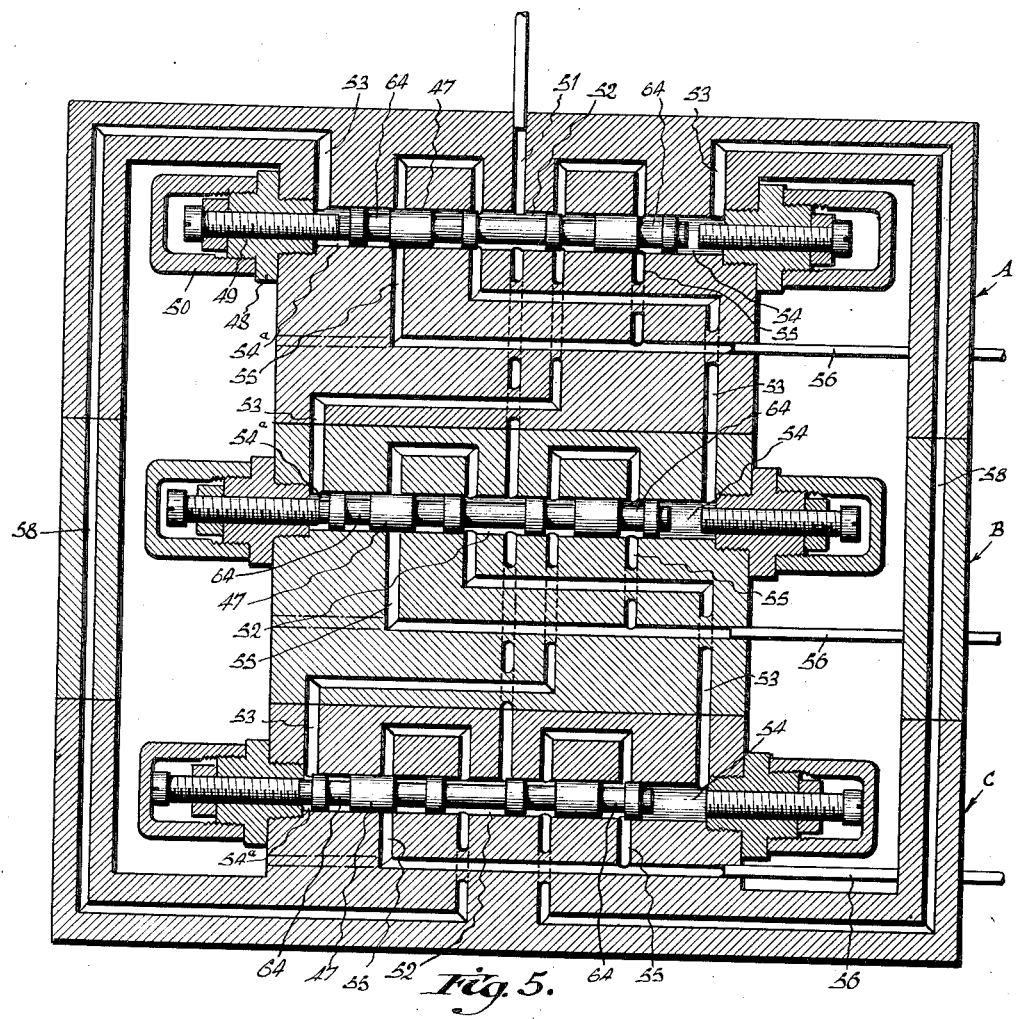

Dec. 19, 1939.　　　　E. O. COREY　　　　2,183,986
FORCE FEED LUBRICATOR
Filed March 16, 1937　　　　4 Sheets-Sheet 4
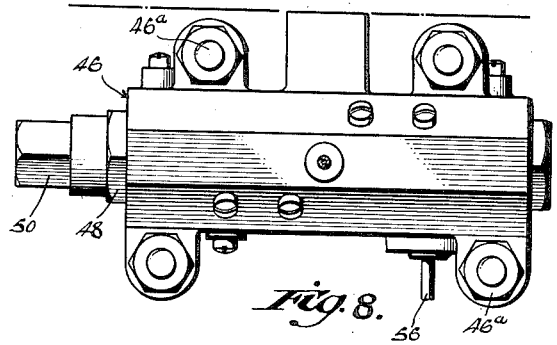
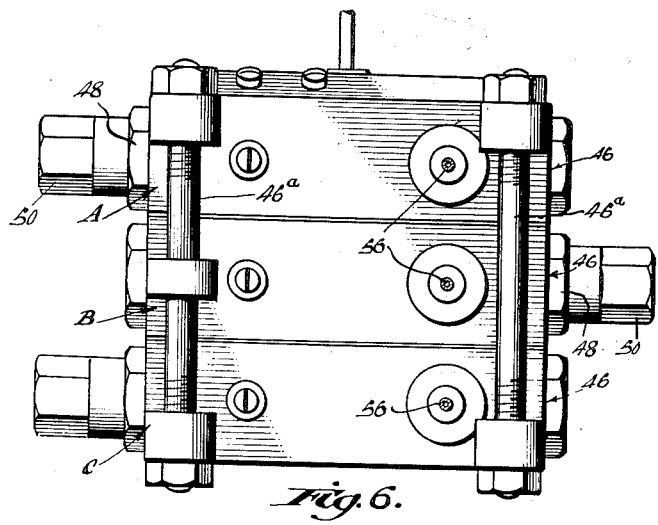
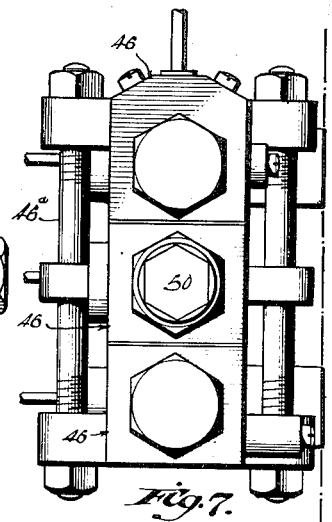
INVENTOR.
Elmer O. Corey
BY Wood & Wood ATTORNEYS.

Patented Dec. 19, 1939

2,183,986

UNITED STATES PATENT OFFICE 2,183,986

FORCE FEED LUBRICATOR

Elmer O. Corey, Norwood, Ohio, assignor to The Edna Brass Manufacturing Company, Cincinnati, Ohio, a corporation of Ohio Application March 16, 1937, Serial No. 131,208

3 Claims. (Cl. 184—7)

This invention relates to a centralized distribution lubricating system and method for supplying lubricant under pressure to a multiplicity of parts or points in regulated or measured quantities, to meet the requirements for each part. The system is primarily applicable to locomotives, to which reference is particularly made, although its use for other machinery is contemplated.

Considerable difficulty has been encountered in providing a locomotive with a centralized lubricant distributor system. Due to the difficulty and necessity of securely mounting the lubricant distribution pipe lines, because of the severe vibration to which they are subjected, and also to avoid complexity, it is preferable to have as small a number of feed lines as possible leading from the lubricator. This necessitates dividing each line into branches or tributaries for accommodating as many points as possible which the capacity of the single line will serve.

Heretofore efforts have been made to subdivide a supply line by manifolds and to institute in each branch control devices, either at the manifold or terminal thereof, in an attempt to deliver relatively varying quantities of lubricant to the various parts, under varying pressures. With these systems considerable trouble has been experienced on account of the relative variations in pressure required to effectively and efficiently dispatch the lubricant to each point, so that those points which offer little resistance to the flow or delivery will usually receive an over-supply, while those points presenting considerable resistance will receive either none or an inefficient supply.

This necessitates a careful selection of a group of points which would be noninterfering or a material reduction of the number of branch lines or divisions, necessitating an increase in the number of main lines from the lubricator and calling for a change in the size of lubricator from that with which the locomotive was originally equipped, thereby adding to the alteration or maintenance cost so that the old method of hand service had to be continued for many of the points.

The present invention embodies the dividing of a single feed from the lubricator for a multiplicity of points, the division made near the points to be lubricated and the lubricant positively delivered under a maximum pressure to each point in regulated quantities to meet the needs thereof without interference one with the other.

An object of the invention is to provide a divider for subdividing at a central point the delivery of lubricant supplied from a single feed to individually lubricate a multiplicity of parts. By the use of the divider, one feed line from a force feed lubricator may be split near places oiled and a connection made from the divider to the point to be lubricated, by short pipe work or flexible connections, as points that have movement may be lubricated, as well as points that have no movement, thereby reducing the number of primary feeds out from the lubricator, at a greatly reduced cost of installation and for obtaining the most efficient results as there is no possibility of the delivery to one point affecting the delivery to another, due to any variation in pressure or volume that one requires over another.

Another object of the invention is to provide a lubricant distribution system with distributors, for manifoldly distributing and dispensing a lubricant to a multiplicity of points, supplied from a single source or dispatch line, providing a lubricant under pressure, each of the distributors receiving a division of the supply and operable by the pressure thereof for impulsively dispatching and dispensing the same in regulated quantities or charges to the point or points to be lubricated.

Other objects and further advantages of the invention will be more fully apparent from a description of the accompanying drawings, in which:

Figure 2 is a side elevation of the distributor assembly shown in Figure 1.

Figure 3 is an end elevation thereof.

Figure 4 is a top plan view thereof.

Figure 5 is a diagrammatic sectional view similar to Figure 1 of a modification.

Figure 6 is a side elevation of the modified distributor assembly shown in Figure 5.

Figure 7 is an end elevation thereof.

Figure 8 is a top plan view thereof.

Figure 9 is a plan view of the plunger or valve illustrated in Figure 1 for the several distributors.

Figure 10 is a plan view of a modified form of valve or plunger.

Figure 1:
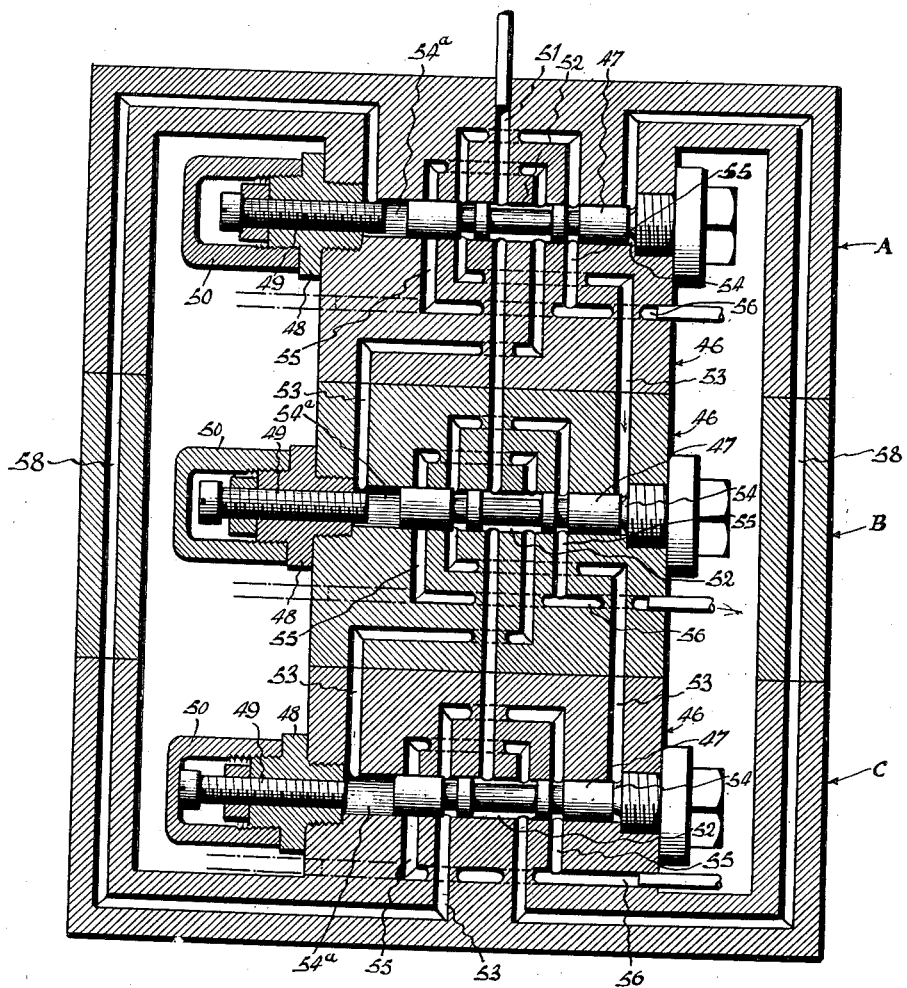
Figure 1 is a diagrammatic sectional view of a plurality of distributors in a unitary assembly, and operating in seriatim for sequentially dispensing the lubricant.

The lubricator or system constitutes a plurality of reversely operated piston pumps or distributors. The piston and reversing control for each pump or forcer unit is actuated by the pressure of the distributing lubricant, each for dispelling a charge thereof under pressure to a point to be lubricated.

In the arrangement shown in Figures 1 and 5, the pumps or distributors for the number required are in unit assembly and relatively sequentially operative in a definite order or train, one controlling the other in a cyclic manner as to reversing direction, thereby eliminating the use of a common reversing control valve. The distributors for use in an assembly receive their supply from a force feed lubricator of a conventional type employed for centralized distributing lubricator system, as used on a locomotive. The force feed lubricator to which the present invention is applicable, therefore, may be of a type as illustrated in Letters Patent No. 1,897,791, issued to me February 14, 1933, by making a connection with one of the several distributing outlets, adapting a single outlet to serve a plurality of tributaries for distributing the lubricant from a single feed line to a multiplicity of points. Each outlet of the lubricator has its own forcer mechanism of the nature of a plunger pump operated by a suitable mechanism connecting with an operating part of a locomotive, as a driving gear, so that the pumps of the lubricator are always in operation when the locomotive is in motion. Each of the outlets is effective for delivering the lubricant at a maximum pressure for the point or points, supplying the delivery of lubricant at the highest pressure, the pump or forcer developing a lubricant distributing pressure to a degree that will be required to supply lubricant to any part in service connection therewith.

Illustration and detailed description of a conventional force feed lubricator is herein omitted, as it forms no part of the present invention, and provides merely a means for delivering lubricant under a determined pressure to the distributor system of the present invention.

In the form of a multiple distributor shown in Figure 1, a plurality of distributor units or sections are unitarily assembled, the sections adjoiningly arranged and clamped together, each individually discharging or forcing charges of lubricant, each to a respective point or part to be lubricated. The arrangement thus provides for readily increasing the number of sections to individually serve as many different points as possible for a given supply capacity. The volume or quantity discharged of each of the sections is regulated independently of the other to meet the individual requirements of each point served. According to the arrangement shown in said figure, the assembly comprises three sections, of which the first controls the second, the second the third, and the third the first, with the actuating pistons or plungers thereof moving in a consecutive order, first in one direction and then correspondingly in a reverse direction. The pressure of the flowing or supplying fluid provides the means for operating the movable parts, and this fluid is divided and ultimately discharged in measured quantities for forcible dispensation to the respective points for lubrication.

The major part of the sections is of duplicate construction, varying only as to the embodiment of certain passages within the body of the section to avoid making numerous pipe or tap connections, which would add complications in assembly and maintenance.

Each of the sections A, B and C comprises a body 46, having either or both of its opposite sides planed or machined for adjoiningly clamping in intimate contact with a second section, under compression by tie bolts 46ª, for making a fluid tight unit and passage registration and connection for the various passages required, leading from one section to the other.

The body has a bore extended therethrough for receiving a reciprocable plunger or slide valve 47, having a plurality of annular grooves formed therein, three in number, each to provide a fluid controlling chamber for interconnecting passages or diverting or controlling the flow of the fluid from one lead line to another, or otherwise. The slide valve 47, at each of its opposite ends, contacts abutments to provide clearance for exposing the head end of the valve to the fluid or fluid pressure for instituting a movement of the valve by the fluid pressure against one end of the valve, and forcibly discharging the fluid from the chamber at the opposite head end of the valve.

One of the opposite ends of the valve bore is sealed by a flanged nipple 48, screw-threaded into the body of the section or unit, having a stop screw 49 extended therethrough, the inner end engaging with the relative end of the slide valve 47, limiting its stroke. The opposite end of the screw 49 is exteriorly accessible for manual regulation. The head end of the screw 49 is enclosed by cap 50, screw-threaded upon the outer end of the nipple 48 to seal the same against any leakage of fluid.

A passage 51 extends through the body of the section, preferably centrally thereof, intersecting the bore for the valve, and is open at its opposite ends for communication with a corresponding passage of adjoining units or sections with the passage for one or the outer or end unit of the series, leading to a supply source as a force feed lubricator, and the passage for the unit at the opposite end is enclosed, as no outlet is required.

The supply connection, therefore, is continuous from the supply source to each section of the group, each for distribution of the portion of the supply, dividing the same for distribution to one of the points to be lubricated or served thereby.

The passage 51 communicates with an intermediate valve chamber 52, from which it is alternately diverted and controlled for the operating supply and lubrication discharge for an adjoining section. Each unit, therefore, is provided with return or U passages, portions of each at relatively opposite sides of the central supply passage 51, providing a pair of leads intersecting the bore or cylinder for the valve, to be controlled by the valve—one as a cross lead or passage 53 for communication with a chamber or passage 54 at one head end of the valve of an adjoining section, and a second lead 55 in communication with a discharge outlet 56, to which the discharge lead of both sets is common.

The cross leads 53 alternately serve for supply or discharge through the control of slide valve 47. Thus, in one instance, they connect with the supply passage 51 for instituting valve movement, and alternately with a discharge lead 55 for dispensing a quantity of lubricant, forced or displaced from the forcer or driven end of the valve.

In the assembly example illustrated, embodying three sections, the valve of the upper end unit controls operation of the valve for the intermediate or second unit, which in turn controls the valve for the third unit, the third in turn controlling the first. The valves move in a consecutive order, one after another, first in one direction and then correspondingly follow in a reverse direction for each cycle, with the circuits or flow of the fluid being as follows.

The fluid from a supply source, conveyed under pressure, passes through the central passage 51 which is in continuous circuit with the valve chambers 52 of all of the sections, and as illustrated the valves of each section are in a corresponding position to the right. All are set for relative different quantity discharge, administered by each stroke of the respective valves.

The valve actuating pressure, when the valves are in their right position as shown, must be delivered to the right end of the valve 47 to move the same to the left. As the valve for the distributing section A controls the time and operation of valve section B, the valve of section B controls the valve of section C, and correspondingly the valve of section C controls the valve of section A, it therefore will be observed that the lead 53 from the left side of section C extends to the left chamber 54ᵃ of section A, and with the valve of section C in its extreme right position the right chamber 54 of section A is open to communication with the supply passage 51 through the intermediate valve chamber 52 of the valve for section C.

Therefore, the valve of section A will be moved to the left as soon as the volume of pressure builds up or is sufficient, the timing interval being governed by the rate of operation and the regulation of lubricant delivery of the force feed lubricator. Movement of the valve of section A to the left forces a definite quantity of fluid or lubricant from its left valve chamber 54ᵃ through the passage 58, as a continuation of the lead 53 of section C, in communication with the outlet passage 56 of section C to the point to be lubricated.

When the valve for section A has completed its stroke to the left, cross lead 53, designated as a right lead by reason of its communication with the right head chamber 54 of section B, is thrown into communication with the supply passage 51 through the central valve chamber 52 of section A, whereupon the pressure forces the valve of section B to the left. As the valve of section B is forced to the left it will displace a quantity of fluid or lubricant in the left head chamber 54ᵃ of said section B, through the left cross lead 53 of section A and left return bend of section A, open to communication with the outlet passage 56 of section A.

A similar circuit is effected through sections B and C after the valve for the section B has completed its right stroke for operating the valve of section C. The valve of section C, following its operation to the left, controls the valve of section A for a movement to the right, as alternate to that previously described for a movement to the left. The valve chambers are properly sized and spaced so that the stroke or movement of the valve may be regulated by the adjusting screws without destroying control of a valve for an adjoining or second section. For example, the movement of the valve of section A is adjusted for, say, a one-eighth inch valve stroke, three-eighths inch stroke for valve of section B, and five-eighths inch stroke of valve of section C.

During the period that a valve of one section serves to distribute lubricant to and from a second or next adjoining section, it is hydraulically held against movement as the passage leading to one end of its cylinder is opened to the supply or passage 51. Its plunger or valve is subjected to a pressure, leaving no opportunity to disturb its position by any back or counter pressure imposed upon the plunger or valve served.

As shown in Figure 3, the sections are assembled in a horizontal plane with the outlet or discharge lines at the bottom, it being preferable to mount the distributor at a lower elevation than the points to be lubricated. The distributor may comprise an assembly of preferably three or more sections, the number being limited to the capacity of the primary inlet and upon the volume required for delivering the necessary amount of lubricant to all of the points served.

For locomotive service having a large number of points to be served, some of which require only a meager supply, it is feasible to embody a large number of sections in a single assembly. The assembly is attached to a rigid part of the locomotive, with the individual discharge lines extended in various directions to accommodate the points to be lubricated.

The dividers or assembly may be placed at any location along the entire length of the locomotive, preferably at an elevation lower than the lowest outlet or lowest point to be lubricated. This will prevent the lubricant from draining out of the pipe connection from the distributor to the point to be lubricated, so there is lubricant available the instant the engine is started.

As illustrated, the end sections are somewhat relatively differently passaged or ported, and in this connection vary slightly from the intermediate section, in which instance for increasing the number of sections for an assembly sections corresponding in structure to the intermediate section are added between the end sections, as for forming an assembly or divider from six to eight sections, four or six sections corresponding to the intermediate section B are added. This is primarily intended for the purpose of eliminating any outside sections of piping or fitting which would complicate assembly and would be liable to breakage, particularly for locomotive service, where the parts are subjected to severe vibration. It is particularly advantageous to reduce the number of fittings which are more or less subject to leakage. In the present method, each point is effectively lubricated and the volume discharge from one section in no wise affects that of the other, as is the case in many systems heretofore employed, particularly as there is considerable variance in the degree of pressure required to properly deliver the lubricant to one point over another The line offering the least resistance to the discharge of lubricant does not receive an overabundant supply, nor affect the supply to a point which must be administered under a high degree of pressure.

The modified distributor assembly illustrated in Figures 5 to 10 inclusive is similar in operation to that disclosed in Figure 1 and therefore will be readily understood from the drawings without additional explanation other than the following.

Each slide valve 47 in this instance is provided with two additional annular grooves 64—64 at opposite ends thereof. These grooves control the opening and closing of passages 55 which lead to the discharge leads 56, the same as shown in Figure 1. As shown in Figure 5, the slide valves 47 are in the left position. It will be seen that in this position the left passage 53 is open from the left chamber 54ᵃ of the section B, the charge of lubricant confined in this chamber having been discharged through the passage 53 across a second groove of the slide valve and conducted by the U shaped passage above the valve to the groove 64, which is in connection with the passage 55 to the discharge lead 56.

The methods of oil control, as illustrated, may be either by adjusting screws or stops at one or opposite ends of the valves or plungers, as shown in Figure 1, or by changing the linear dimension of the central chamber of the valve 47, as shown in Figure 10, which is reduced over that shown in Figure 9, thereby reducing the area of portage of the passages which open to the chamber.

As shown, each section has only one discharge outlet extending to the right, for all of the sections. This, however, could be divided and a second discharge for each provided, as shown by dotted line for section A, in Figures 1 and 5, and by blanking the discharge connection between the two discharge ends of the unit or section. Such method would be employed for connection for points requiring very little lubrication.

The frequency of discharge is governed principally by the volume of lubricant required to replenish the displaced lubricant from the respective chambers or passages of the distributor units, and by the time required for rebuilding the pressure necessary to move the valves or plungers to an alternate position, so that if the volume of discharge is comparatively small, the frequency of operation is increased. This also is governed to a degree by the distributing volume of the force feed lubricator from which the lubricant supply is taken.

Having described my invention, I claim:

1. A lubricator for forcibly delivering lubricant to a plurality of points supplied under pressure from a single feed line, comprising, three or more cylinders, a duct for supplying lubricant under pressure connecting at an intermediate point with each of the cylinders providing a common supply to all of the cylinders, an outlet passage for each cylinder, a set of passageways for each cylinder connecting an intermediate portion thereof and relatively at opposite sides of the supply duct respectively with the opposite ends of another cylinder, each to supply to and discharge from an end of a cylinder and for the series of cylinders relatively connecting a first cylinder with a second, the second with a third, and the last of the series with the first, and for seriatim control of plungers, one respectively reciprocable in each cylinder, a plunger reciprocable in each cylinder, the intermediate portion thereof arranged that when positioned at one end of a stroke it connects one of the said passageways with the supply duct through one cylinder to one end of another cylinder, and the other of said passageways with the outlet passage of one cylinder and opposite end of the other cylinder, and vice versa when the plunger is positioned at the end of a reverse stroke, the arrangement providing for a forcible discharge of lubricant from end of one cylinder, effected by its moving plunger, through the outlet passage controlled by the plunger in another cylinder, the lubricant having previously been admitted into the end of the cylinder under pressure from the supply duct for moving the plunger and thence holding the plunger against movement under pressure while serving for the control of a plunger in another cylinder.

2. A lubricator for forcibly delivering lubricant to a plurality of points supplied under pressure from a single feed line, comprising: three or more cylinders for a unit, a plunger in each cylinder reciprocated by lubricant under pressure conducted into one head end of the cylinder and in its movement forcing lubricant from the opposite head end of the cylinder, a duct connecting with each cylinder of the unit at an intermediate point thereof, providing a common conductor for all of the cylinders connecting with a source for delivery of lubricant under pressure, a set of passageways for each cylinder, one connecting an intermediate portion of the cylinder at a point at one side of the supply duct with a head end of another cylinder, and a second connecting an intermediate portion of the cylinder at a point at an opposite side of the supply duct with an opposite head end of said other cylinder, said passageways each alternately serving for supply to and discharge from a head end of one cylinder controlled by the plunger in the other cylinder and relatively arranged for a first cylinder of a series in a unit to control a second, the second a third, with the last controlling the first, each cylinder having its own outlet ducts, one positioned between one end of the cylinder and the point where one passageway connects into said cylinder, and the other located between the other head end of the cylinder and the point where the other passageway connects into said cylinder and controlled by the plunger in said cylinder, the plungers each toward its opposite ends arranged to open an outlet duct, and vice versa, and the plungers each having an intermediate portion to open one passageway to the supply duct while the other passageway is closed to the supply duct and opened to an outlet duct, whereby when the plunger is positioned toward one end of the cylinder, lubricant is passed through one passageway from the supply duct to the head end of a second cylinder to shift the plunger therein and force lubricant from the opposite head end of said cylinder through the other passageway and out through an outlet duct of the first cylinder, and while the plunger of the second cylinder is moving, the plunger in the first cylinder is held against shift under the pressure of lubricant controlled by the plunger of a third cylinder.

3. A lubricator for forcibly delivering lubricant to a plurality of points supplied under pressure from a single feed line, comprising: three or more cylinders for a unit, a plunger in each cylinder reciprocated by lubricant under pressure conducted into one head end of the cylinder and in its movement forcing lubricant from the opposite head end of the cylinder, a duct connecting with each cylinder of the unit at an intermediate point thereof, providing a common conductor for all of the cylinders connecting with a source for delivery of lubricant under pressure, a set of passageways for each cylinder, one connecting an intermediate portion of the cylinder at a point at one side of the supply duct with a head end of another cylinder, and a second connecting an intermediate portion of the cylinder at a point at an opposite side of the supply duct with an opposite head end of said other cylinder, said passageways each alternately serving for supply to and discharge from a head end of one cylinder controlled by the plunger in the other cylinder and relatively arranged for a first cylinder of a series in a unit to control a second, the second a third, with the last controlling the first, each cylinder having its own outlet ducts, one positioned between one end of the cylinder and the point where one passageway connects into said cylinder, and the other located between the other head end of the cylinder and the point where the other passageway connects into said cylinder and controlled by the plunger in said cylinder, the plungers each toward its opposite ends arranged to open an outlet duct with a passageway while closing the other outlet duct, and vice versa, and the plungers each having an intermediate portion to open one passageway to the supply duct while the other passageway is closed to the supply duct and opened to an outlet duct, whereby when the plunger is positioned toward one end of the cylinder, lubricant is passed through one passageway from the supply duct to the head end of a second cylinder to shift the plunger therein and force lubricant from the opposite head end of said cylinder through the other passageway and out through an outlet duct of the first cylinder, and while the plunger of the second cylinder is moving, the plunger in the first cylinder is held against shift under the pressure of lubricant controlled by the plunger of a third cylinder, and an adjustable abutment for limiting the stroke of a plunger.

ELMER O. COREY.